US012617122B2

(12) United States Patent
Sin Xicola et al.

(10) Patent No.: US 12,617,122 B2
(45) Date of Patent: May 5, 2026

(54) METHOD FOR MAKING A FRICTION MATERIAL, IN PARTICULAR FOR MAKING BRAKE PADS AND RELATIVE BRAKE PADS

(71) Applicant: ITT Italia S.r.l., Lainate (IT)

(72) Inventors: Agustin Sin Xicola, Barge (IT); Francesco Vannucci, Barge (IT); Paolo Colombo, Barge (IT); Alberto Conte, Barge (IT); Luca Martinotto, Barge (IT)

(73) Assignee: ITT ITALIA S.R.L., Lainate (IT)

( * ) Notice: Subject to any disclaimer, the term of this patent is extended or adjusted under 35 U.S.C. 154(b) by 419 days.

(21) Appl. No.: 17/794,238

(22) PCT Filed: Jan. 20, 2021

(86) PCT No.: PCT/IB2021/050418
§ 371 (c)(1),
(2) Date: Jul. 20, 2022

(87) PCT Pub. No.: WO2021/148959
PCT Pub. Date: Jul. 29, 2021

(65) Prior Publication Data
US 2023/0067524 A1     Mar. 2, 2023

(30) Foreign Application Priority Data
Jan. 20, 2020     (IT) ........................ 102020000001012

(51) Int. Cl.
B28B 1/14          (2006.01)
B28B 1/52          (2006.01)
(Continued)

(52) U.S. Cl.
CPC .............. B28B 1/14 (2013.01); B28B 11/24 (2013.01); C04B 12/005 (2013.01);
(Continued)

(58) Field of Classification Search
CPC ... B28B 1/14; B28B 1/52; B28B 11/24; F16D 2250/0007
See application file for complete search history.

(56) References Cited

U.S. PATENT DOCUMENTS 6,316,086 B1     11/2001  Beier et al.
10,472,282 B2 *  11/2019  Autef .................... C04B 28/006
(Continued)

FOREIGN PATENT DOCUMENTS

CN          1382111 A      11/2002
CN        106350008 A       1/2017
(Continued)

OTHER PUBLICATIONS

International Search Report and Written Opinion for PCT/IB2021/050418; Dated: Apr. 6, 2021; 10 pages.
(Continued)

*Primary Examiner* — Jerzi H Moreno Hernandez
(74) *Attorney, Agent, or Firm* — Barclay Damon LLP

(57)          ABSTRACT

Method for producing a friction material, including the following steps in sequence: mixing an aluminosilicate source with an alkaline silicate solution to form a geopolymer, adding a friction mix to the geopolymer solution of the previous step to obtain a slurry, casting the slurry in a mold at temperature between room temperature and 120° C. and for between 5 min and 2 h and demolding to obtain a pad, attaching a backplate to the pad, curing for a time between X and Y hours at a temperature of between X and Y. The friction material obtained with the method is for the manufacture of friction layers/blocks for friction elements such as braking elements, including vehicle brake pads or blocks, and/or friction discs.

8 Claims, 3 Drawing Sheets

(51) Int. Cl.

| | |
|---|---|
| B28B 11/24 | (2006.01) |
| C04B 12/00 | (2006.01) |
| C04B 28/00 | (2006.01) |
| F16D 65/092 | (2006.01) |
| F16D 69/02 | (2006.01) |
| C04B 111/00 | (2006.01) |

(52) U.S. Cl.
CPC .......... C04B 28/006 (2013.01); F16D 65/092 (2013.01); F16D 69/028 (2013.01); C04B 2111/00362 (2013.01); F16D 2200/0065 (2013.01); F16D 2250/0007 (2013.01)

(56) References Cited

U.S. PATENT DOCUMENTS

| | | | | |
|---|---|---|---|---|
| 2017/0016500 A1* | 1/2017 | Sin Xicola | ............ | F16D 69/028 |
| 2021/0094877 A1* | 4/2021 | Cai | ............................ | B28B 1/20 |

FOREIGN PATENT DOCUMENTS

| | | | | | |
|---|---|---|---|---|---|
| CN | 108350965 A | | 7/2018 | | |
| CN | 108367986 A | | 8/2018 | | |
| CN | 109400030 A | | 3/2019 | | |
| CN | 110081107 A | | 8/2019 | | |
| DE | 4024547 A1 | * | 2/1992 | .......... | F16D 69/027 |
| DE | 10113918 A1 | | 10/2002 | | |
| DE | 10132659 A1 | | 1/2003 | | |
| EP | 3085985 A1 | | 10/2016 | | |
| EP | 3128201 A2 | | 2/2017 | | |
| EP | 3381996 A1 | | 3/2018 | | |
| EP | 4093988 B1 | | 2/2024 | | |
| FR | 2659319 A1 | | 9/1991 | | |
| GB | 2357517 A | | 6/2001 | | |
| JP | 2000039032 A | | 2/2000 | | |
| WO | 03/004899 A2 | | 1/2003 | | |
| WO | WO-2014081277 A1 | * | 5/2014 | .......... | C04B 28/006 |
| WO | 2020039396 A1 | | 2/2020 | | |

OTHER PUBLICATIONS

Written Opinion for PCT/IB2021/050418; Dated: Dec. 3, 2021; 8 pages.
International Preliminary Report on Patentability for PCT/IB2021/050418; Dated: Feb. 23, 2022; 15 pages.
China National Intellectual Property Administration; Notification of the First Office Action; Patent Application No. 202180009953.2; Mailing Date: Jun. 28, 2024; (12 pages) English Translation.
China National Intellectual Property Administration; Notification of the First Office Action; Patent Application No. 202180009953.2; Mailing Date: Jun. 28, 2024; (7 pages).
European Patent Office; First Notice of Opposition; European Application No. 21700650.1; Patent No. EP 4093988; Dated: Nov. 28, 2024; 5 pages.
European Patent Office; Second Notice of Opposition; European Application No. 21700650.1; Patent No. EP 4093988; Dated: Dec. 4, 2024; 7 pages.
European Patent Office; International Search Report and Written Opinion; International Application No. PCT/IB2021/050418; Dated: Apr. 6, 2021; 8 pages.
EuroBrake Poster Session; EB2018-MDS-005; Additive Manufacturing—3D-Printing of Friction Materials; 1 page, No visible date.
EuroBrake Poster Session; EB2019-MFM-002; Additive Manufacturing—3D Printing of Friction Materials (2) Water-based Liquid Friction Compounds;1 page, No visible date.
Bonfanti Dissertation—WBH12; Opposition against EP4093988; University of Trento, Department of Industrial Engineering; Jun. 2016; 214 pages.
European Patent Office; Opposition against EP4093988; WBH14e; English Translation of CN110081107A, The provided translation is 1 pg. long, so the translation is incomplete.
Exhibit WBH3—Granted Claim 1;Opposition against EP4093988; 1 page, Not Prior Art.
European Patent Office; International Preliminary Report on Patentability; International Application No. PCT/IB2021/050418; Dated: Feb. 23, 2022; 7 pages.
WBH1—EP4093988; Opposition against EP4093988; 16 pages.

* cited by examiner

100

102

Mix aluminosilicate source with alkaline silicate solution

104

Add friction mix to form slurry

106

Cast slurry in mold and solidify

108

Demold solidified slurry

110

Attach backplate

112

Cure the brake pad(s)

200

202

204

1

METHOD FOR MAKING A FRICTION MATERIAL, IN PARTICULAR FOR MAKING BRAKE PADS AND RELATIVE BRAKE PADS

CROSS-REFERENCE TO RELATED APPLICATIONS

This application is a national stage application under 35 U.S.C. § 371 of International Application No. PCT/IB2021/050418, filed Jan. 20, 2021, which claims priority of Italian Patent Application No. 102020000001012, filed Jan. 20, 2020, the entire contents of each application being herein incorporated by reference.

TECHNICAL FIELD

The present disclosure generally relates to methods for producing a friction material, in particular for making friction blocks and associated brake pads.

SUMMARY

Embodiments of the disclosure illustrate more efficient methods for the production of friction material for friction elements, such as braking elements, e.g., vehicle brake pads or blocks, and preparation of the associated friction material and a respective inorganic binder, which facilitate the obtaining of friction materials and associated brake pads resistant to the heat generated during braking, simultaneously providing optimal braking performance and optimal tribological characteristics.

EP3128201 discloses a method for obtaining a binder for brake pads. The use of a geopolymer substitutes the traditional process using a phenolic resin. However, there can be certain disadvantages associated with the dry grinding process described in EP3128201.

GB2357517 discloses a friction material comprising a continuous phase which is a reaction product obtained by reacting an alkali metal hydroxide, the metal being from Group 1 of the periodic table, and/or an alkali silicate, and reactive finely-divided material comprising silica, silicates, and/or aluminates.

For example, during grinding (performed in air) and during opening of the grinder and unloading of product, soda powders can absorb a significant quantity of moisture from the environment.

Some of this residual moisture is retained by the soda in subsequent mixes with kaolin and with other fillers added to the friction material compound, and is released in the form of a vapor during the hot molding of brake pads, which can some flaking and cracking in the finished friction material.

However, embodiments of the friction material in this disclosure can be used for the manufacture of friction layers/blocks for friction elements, such as braking elements, i.e. vehicle brake pads or blocks, and/or friction discs, asbestos free, with performance similar to or better than those belonging to the NAO ("Non-Asbestos Organic friction material"), "Low Steel" and "Semi-met" classes of friction materials, while avoiding certain disadvantages disclosed above.

The disclosure therefore can generally relate to a method for producing a friction material for friction elements such as braking elements, e.g. vehicle brake pads or blocks, as defined in the attached claims.

The disclosure also generally relates to associated binders and friction elements, particularly brake pads or blocks, presenting a friction layer or block produced with the method of the disclosure.

According to the present disclosure, such aim is obtained by the method for producing a friction material and by the method for producing a brake pad according to the claims.

According to the present disclosure the method for producing a friction material, includes the steps of, preferably carried out in sequence:

a) mixing an aluminosilicate source with an alkaline silicate solution to form a geopolymeric solution, wherein any geopolymer is not yet completely formed;

b) adding a friction mix to the geopolymeric solution of the previous mixing step to obtain a slurry;

c) casting the slurry in a mold at a temperature between room temperature and 120° C. and maintaining the slurry inside the mold for a time comprised between 5 minutes and 2 hours, anyway until the slurry is substantially solidified; and d) demolding the solidified slurry to obtain a pad or block of solid friction material.

In some embodiments of the method disclosed herein, the mixing step can be carried out so as to have at the end thereof a slurry having a pseudoplastic behavior consisting of the aforementioned geopolymeric solution. For a pseudoplastic solution, a shear-thinning fluid, such as where the viscosity of these fluids will decrease with increasing shear rate.

In some embodiments, the addition of a friction mix to the geopolymeric solution is carried out to obtain a slurry (e.g., a mixture including particulate solids suspended in water and/or another liquid) with pseudoplastic properties.

In some embodiments, the $SiO_2/Al_2O_3$ molar ratio in the slurry is preferably between 3 and 5.

The $SiO_2/R_2O$ ratio is preferably between 0.7 and 1.5 and R can be selected among Na, K, Li, Ce, Ru.

Preferably, the $H_2O/Al_2O_3$ molar ratio is between 10 and 25.

The disclosure also generally relates to embodiments of methods for making a braking element, in particular a brake pad, comprising carrying out the method for producing a friction material as above and the further step of: e) attaching a backplate to the pad or block of solid friction material either as a consequence of the casting step or after the pad or block of solid friction material is demolded.

The method for making a braking element, in particular a brake pad, comprises the further step of: f) curing for a time between 1 and 24 hours and at a temperature of between 60 and 120° C. the pad or block of solid friction material having the backplate attached to it.

BRIEF DESCRIPTION OF DRAWINGS

Preferred but not limiting embodiments will be now described in more detail with reference to a number of practical working examples of implementation thereof which are solely intended to disclose in a non-exhaustive and not limiting manner the feature which are part of the content of the present disclosure, and with reference to the figures of the attached drawings, in which:

FIG. 3 is a graph illustrating the results of comparative braking efficiency tests according to AKM standard of the same brake pads produced with a prior art formulation of friction material comprising phenolic resin according to the

US 12,617,122 B2

Figure 1:
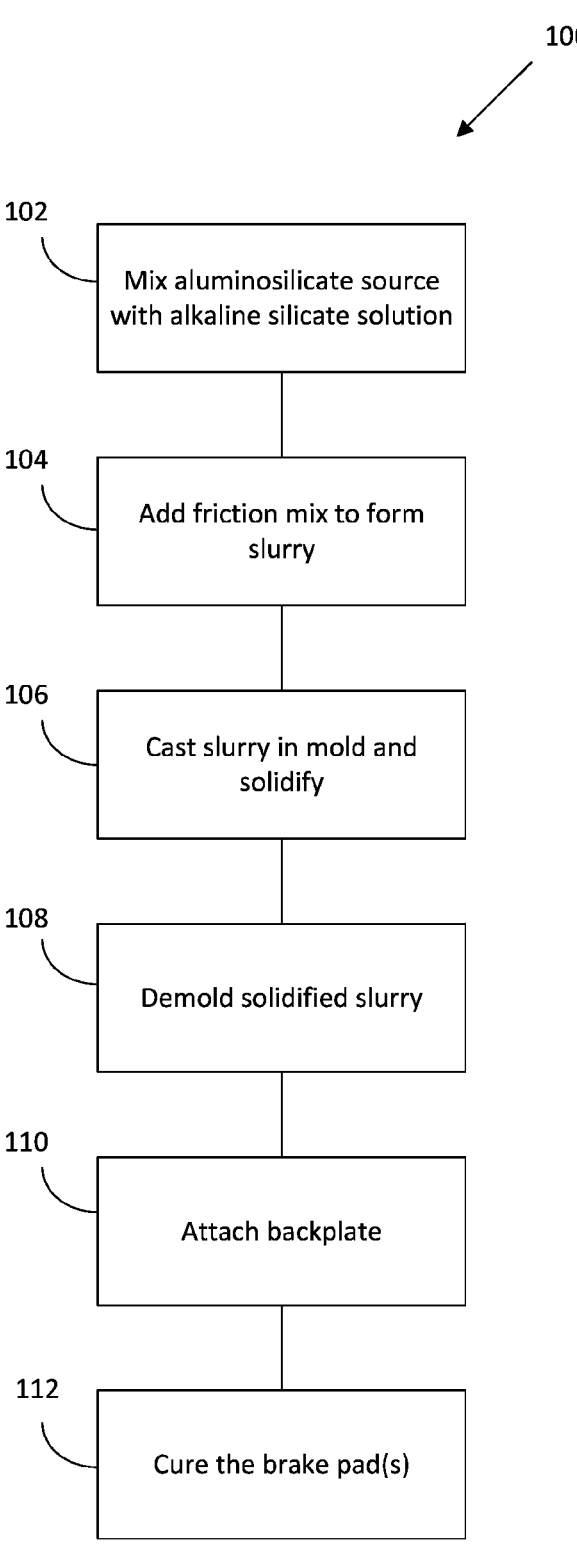
FIG. 1 is a flowchart depicting a method of making friction material according to embodiments described herein.

3 formulation reported in comparative Example 1 and of braking pads obtained with the method of EP3128201 with the formulations of comparative example 2 and of braking pads obtained with the method of the disclosure with the formulations of Example 3.

DETAILED DISCLOSURE

In the following detailed description, reference is made to the accompanying drawings, which form a part hereof. In the drawings, similar reference numbers typically identify similar components, unless context dictates otherwise. The illustrative embodiments described in the detailed description and drawings are not meant to be limiting. Other embodiments may be utilized, and other changes may be made, without departing from the spirit or scope of the subject matter presented here.

In a preferred embodiment, a first step of the process of the disclosure consists in mixing together components suitable to make a geopolymer usable as an inorganic binder to form a fluid geopolymer, i.e. a geopolymer mix in fluid form, since not yet polymerized.

Figure 2:
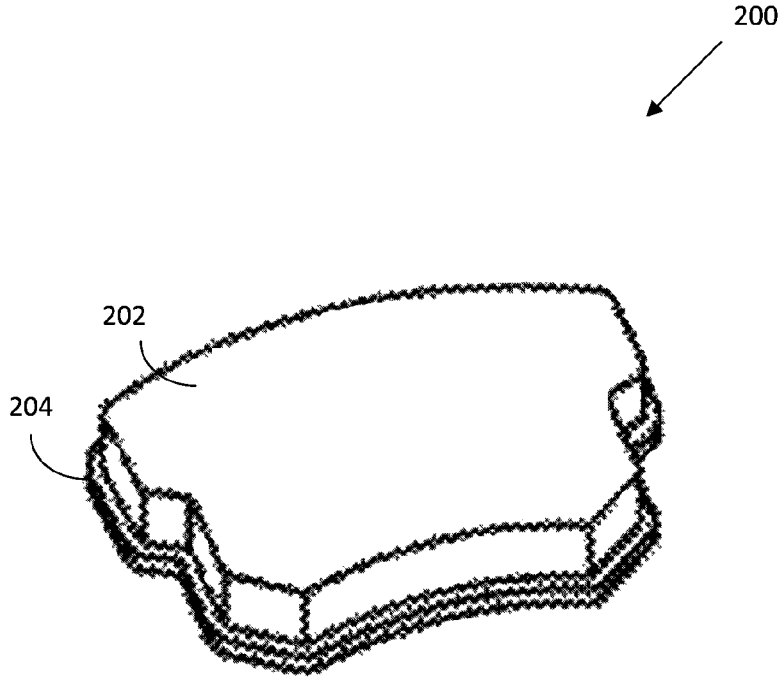
FIG. 2 shows of an example of a brake pad including friction material produced according to embodiments described herein.

FIG. 1 is a flowchart depicting a method 100 of making friction material according to embodiments described herein. FIG. 2 shows of an example of a brake pad 200 including a block of friction material 202 (which is also referred to herein as a "pad") attached to a back plate 204. The block of friction material 204 can be produced according to any of the embodiments described herein, including the method 100 described with respect to FIG. 1.

In particular, the method 100 includes at step 102 mixing an aluminosilicate source with an alkaline silicate solution.

As an aluminosilicate source, metakaolin is preferably used. But other sources of aluminum silicates can also be used in addition or in substitution to metakaolin, such as kaolin or fly ash or bottom ash, or combinations thereof. Moreover, a source of silica, such as quartz, or colloidal silica dissolved in a basic sodium or potassium hydroxide solution, under suitable conditions can also be considered as aluminosilicate source.

Preferably the aluminosilicate source is chosen in the group consisting of metakaolin, kaolin or fly ash or bottom ash.

As a mere example, metakaolin can be used obtained through the high-temperature calcining of kaolin from the company "Imerys Refractory Minerals—Argical-M 1000S". Such metakaolin contains approximately 55% $SiO_2$ and 39% $Al_2O_3$, plus $Fe_2O_3$, $TiO_2$, $K_2O$, $Na_2O$, Cao, and MgO impurities and is generally assumed to have the following general chemical formula:

$$Al_2O_3 \cdot 2SiO_2$$

The alkaline silicate solution is preferably chosen from the group consisting of sodium silicate and sodium hydroxide system, potassium hydroxide and potassium silicate system, lithium hydroxide and lithium silicate system.

A sodium silicate and sodium hydroxide system is preferably used. A potassium hydroxide and potassium silicate system can also be used as an alternative or in combination and similarly other alkaline metals on which geopolymers can be developed, i.e., lithium, cesium, and rubidium, can also be used as an alternative or in combination with sodium and/or potassium. The sodium-based system will be mostly referred to hereinafter.

As a mere example, potassium (or sodium) silicate from the company "Ingessil srl" can be used with the addition of a small quantity of potassium hydroxide (or sodium) The hydroxide is not included in certain other embodiments. Preferably the aluminosilicate source is mixed with the alkaline silicate solution using a stirrer, preferably a mechanical stirrer. The speed of the stirrer can vary in function of the viscosity of the mixture. Preferably the speed is between 200 and 1000 rpm, more preferably between 500 and 1000 rpm. The stirring time can also be varied according to the desired mixture and can vary between 5 and 30 min. As a mere example, the stirring time may be 10 min.

At step 104 of the process, the method 100 can include adding a friction mix to the previously mentioned components of a geopolymer, which are still in solution to obtain a slurry consisting in a friction material in fluid form; in particular a pseudoplastic slurry, i.e. a non-Newtonian fluid, is preferably obtained.

One or more fluid geopolymers (i.e. still not polymerized) with different compositions can be used in combination with the friction mix.

Preferably, the friction mix comprises:
fibers, preferably inorganic and/or organic and/or metallic;
at least one inorganic or metallic filler or abrasive; and
at least one friction modifier and/or lubricant, e.g. including sulfurs
and/or a carbonic material or nanomaterial According to various embodiments, methods described herein:
replace the current organic binders with the inorganic binder as disclosed above;
reduce the content of abrasives;
increase the content of lubricants.

In some embodiments, the friction material obtainable according to the disclosure is also preferably free of copper and/or its alloys, both in powder and in fiber form.

Advantageously, the fibers include at least one of organic, inorganic or metallic fiber, other than asbestos.

Illustrative examples include inorganic fibers such as glass fibers, wool or rock fiber, wollastonite, sepiolite and attapulgite, and organic fibers such as aramid fibers, polyimide fibers, polyamide fibers, phenolic fibers, cellulose and acrylic fibers or PAN (Polyacrylonitrile), carbons fibers (nanotube or another carbon based fiber), metallic fibers such as steel fibers, stainless steel, aluminum fibers, zinc, etc.

Fibers may be used in the form of short fibers.

In some embodiments, the quantity of fibers is preferably between 2% in volume and 30% in volume out of the total volume of friction material. and more preferably between 8% and 15% in volume. In some embodiments, the fibrous component includes rock fiber, which has been shown to have a strong affinity with the geopolymers used as binder.

As organic or inorganic fillers, different materials may be used. Preferably the fillers may be chosen in the group consisting of calcium carbonate, barium sulphate, magnesium oxide, calcium hydroxide, calcium fluoride, slaked lime, talc, mica and their combinations.

The quantities of the fillers is preferably between 2% to 40% in volume based on the total composition of the friction material.

The friction modifier can include all or part of the filler.

The friction modifier comprises preferably at least one material among the following groups:
carbonic materials
graphite
an organic filler such as cashew dust, rubber dust, powdered tread rubber, unvulcanized rubber particles, vulcanized rubber particles, an inorganic filler such as for example barium sulphate, calcium carbonate, calcium hydroxide, vermiculite and/or mica, an abrasive such as silicon carbide, alumina, zirconium silicate, metal sulfide-based lubricant such as molybdenum disulphide, tin sulfide, zinc sulfide, iron and non-ferrous sulfides, metal particles other than copper and copper alloys and/or a combination of the above.

Abrasives can be classified as follows (the list below is only indicative, not necessarily exhaustive and not limiting):

Mild Abrasives (Mohs 1-3): talc, calcium hydroxide, potassium titanate, mica, kaolin, vermiculite;

Medium Abrasives (Mohs 4-6): barium sulphate, magnesium oxide, calcium fluoride, calcium carbonate, wollastonite, calcium silicate, iron oxide, silica, chromite, zinc oxide;

Strong Abrasives (Mohs 7-9): silicon carbide, zircon sand (zirconium oxide), zirconium silicate, zirconium, corundum, alumina, mullite.

Preferably, but not necessarily, the friction material does not contain strong abrasives, but only medium or mild abrasives.

The above formulated geopolymeric slurry may be considered in fact as a medium abrasive in itself when mixed to a traditional friction mix.

The total content of friction modifier may vary according to the desired friction characteristics and is preferably between 2% and 40% of the entire volume of friction material, preferably between 4 and 30% in volume.

The ratio in volume between the friction modifier and the abrasives contained in the friction material to be formed is preferably selected between 1:2 and 1:5, for comparison, this ratio is generally 1:8 or more in known friction materials with organic binder.

It should be noted that the principal abrasive work of the friction material of the disclosure is done by the geopolymeric matrix of the pads, when the geopolymer is completely polymerized to reach a solid form.

Herein, "binder almost entirely constituted by a geopolymer" refers to a binder for friction elements in which geopolymer or a geopolymer compound constitutes at least 30% to 90% in weight of the total quantity of the binder present, more preferably more than 40% in volume.

The binder is preferably present in the compound of the friction material in slurry form in a quantity equal to or greater than 30% in volume or even more preferably greater than 50% in volume, calculated on the total volume of the compound. In fact, experiments have shown that with too small a quantity of inorganic binder, depending on the type of binder and the nature of the other materials used in the compound, the mechanical characteristics necessary for its use as a friction material cannot be achieved.

The friction material according to the method of the disclosure may be almost completely or totally lacking organic binders (which may be present at maximum in a quantity equal to or less than 10% in weight) and, for this reason, not subject to heat degradation through oxidization at high temperatures, e.g., greater than 300° C., and up to beyond 600° C.

The binders produced according to the method of the disclosure and used in the friction material according to the disclosure as the single and principal binder and, therefore, prevalent is obtained, as mentioned above, through a chemical reaction starting from inorganic precursors such as $SiO_2$ and $Al_2O_3$.

The step 104 of mixing the components of the geopolymer and the friction mix is obtained by stirring for a time variable preferably from 5 min to 30 min. Such time can be varied according to the composition of the obtained slurry.

As already mentioned, the slurry obtained by mixing the components of the geopolymer and the friction mix is stirred preferably with a speed of 200 to 1000 rpm. The speed can be varied in function of the rheology of the mix.

After step 104, the method can further include step of casting and solidification 106 and a step of demolding 108 of the friction material slurry.

In particular, the slurry can be cast in a solidified mold at step 106, a pad or block of solid friction material (such as the block of friction material 202 shown in FIG. 2) can be extracted from the mold during demolding at step 108. In some embodiments, the temperature is set between room temperature and 120° C., more preferably. In some embodiments, the temperature is between 60 and 90° C. In some embodiments, the temperature is at 80° C.

Preferably the pads are removed from the mold after a time of between 5 min and 2 hour, more preferably between 10 min and 30 min.

The time and temperature may vary in function of the reactivity. During molding the geopolymer particles consolidate and remain amorphous, resulting in a friction element, typically a brake pad, in which the component materials are dispersed into a matrix constituted solely, or substantially solely, by amorphous geopolymerized inorganic binder.

The method 200 can further include a subsequent step 110 of attaching the pads to a backplate (e.g., by gluing to a backplate such as the backplate 204 of FIG. 2) or the backplate may be arranged inside the mold before the step 106 of casting, so that after the demolding step 108 a complete brake pad may be directly obtained.

Thereafter the pads provided with backplate undergo a curing step 112.

The curing step 112 lasts preferably between 1 and 48 hours, preferably 2 to 12 hours in function of the geopolymer composition, more preferably for 12 hours.

The temperature of the curing step 112 can vary according to the composition, but is preferably comprised between 60 and 120° C., more preferably between 60° and 100° C., more preferably at 80° C.

The starting raw materials for obtaining a geopolymeric binder are selected such that the inorganic geopolymeric binder in the friction material according to the disclosure has a $SiO_2/Al_2O_3$ molar ratio between 3 and 5 and an $SiO_2/R_2O$ molar ratio between 0.7 and 1.5. Preferably the $H_2O/Al_2O_3$ molar ration is between 10 and 25.

The densification of the geopolymer powder is obtained during the casting step 106.

The obtained pad can be used in applications such as disc brake pads, shoes, and linings for cars, trucks, train cars and various other types of vehicles and industrial machines, or in clutch discs.

The result is a brake pad comparable in performance to the one obtained by the process of EP3128201, producing braking performance and disc wear comparable to those of the friction material produced according to the hydrothermal synthesis of EP3128201.

The advantages of the new process for the manufacturing of a brake pad are at least to have a material consolidation in low pressure system compared with the tradition phenolic resin system that requires high pressure.

Moreover, the curing step 112 is done at low temperature (below 120° C.) to develop the maximum physical properties compared with the tradition phenolic resin system that requires higher temperatures (over 200° C.).

The system is more sustainable as it saves more energy during pad production and has less emissions.

The new process allows to tune the viscosity of the mixture in order to use different forming technology (casting, extrusion) and it is possible to vary the water content or to add some rheology-modifier like clay or superplasticizers.

Moreover, the molding can occur without any pressure and the thermal treatment is fast and at a lower temperature than the treatment of known brake pads.

Finally, a smaller space is needed for the production line in comparison with the traditional process, and it is therefore possible to achieve a higher productivity.

The examples and comparative examples are reported herein for purposes of illustration, and are not intended to limit the disclosure.

Comparative Example 1

To compare the performance of a known brake pad comprising a friction material obtained with a known method and comprising an organic binder and, in particular, a phenolic resin, two identical friction material formulations were prepared, using for each component the average value of the intervals reported in table 1, as below:

TABLE 1

| Standard LS Formula | Volume (%) |
|---|---|
| Fibers | 1-4 |
| Binders | 16-20 |
| Friction Dust | 1-4 |
| Mild Abrasives | 15-20 |
| Medium Abrasives | 6-10 |
| Strong Abrasives | 1-6 |
| Lubricants | 6-11 |
| Fillers | 23-29 |
| Metals | 8-12 |
| TOTAL | 100 |

Comparative Example 2

115.7 gr metakaolin from the company "Imerys Refractory Minerals" are mixed with 300.0 gr of aqueous solution of 139.4 g sodium silicate (as already indicated, potassium silicate would also work) in any form, in this case from the company "PQ Corporation-Holland" and 1.51 g caustic soda in pellets, previously prepared, over a time varying from 5' to 45', at a speed of 800 rpm, using a drill agitator along with a specific mixing whisk for medium-high viscosity fluids. The wet paste obtained from mixing the metakaolin with the sodium silicate-caustic soda solution is spread and dried using a sheet of Mylar, specific for wet and alkaline pastes/ mortars using the following parameters: thickness of spread paste between 0.1 and 3 mm, drying temperature between 40° and 250° C., sheet sizes between A3 and A4, drying time variable between 10' and 90'.

The dried binder in solid aggregate form is then detached from the sheets and ground with a ball grinder rotating at 275 turns/min, for 14 hours, to bring the granulation of the product to at least 150 microns.

The final product is a powder ready to be used as a binder.

The granular characteristics of the powdered binder thus produced are shown in the following TABLE 2.

TABLE 2

| Sample | d10 | d50 | d90 |
|---|---|---|---|
| #24- 1 | 8 | 66 | 295 |

The ground product has a granulometry between 300 microns and 7.0 microns, with at least 50% of the product having a granulometry of approximately 50-70 microns.

Two identical friction material formulations were prepared, using for each component the average value of the intervals reported in table 3, below, and using as binder the powders obtained through example 1, indicated as "binder mix".

TABLE 3

| Geopolymeric Mix Materials | % Vol |
|---|---|
| Fibers | 8-25 |
| Friction Modifier | 0.5-3 |
| Carbon | 8-20 |
| Rubbers | 1-4 |
| Medium Abrasive | 5-15 |
| Mild Abrasive | 9-12 |
| Sulphurs | 3-10 |
| Inorganic Binder Mix | 20-60 |
| TOTAL | 100 |

The binder mix is added to the other ingredients of the mix according to a general scheme: binder 20-60% in weight, other components 40-80% in weight; the mix is done with a Loedige mixer.

Subsequently, with the two mixes obtained, identical in quantity and components, except for the fact of using the binder according to EP3128201, two series of identical brake pads are molded, each placing the raw or "green" compound and a metallic support into one mold. Molding takes place by steps at temperatures of 100-150/70-135/70-135° C., subjecting the raw compound to a molding pressure of 250-720 Kg/cm2 for a time of 2-15 minutes.

Illustrative Example 3

In a first step 367.9 g. of Potassium disilicate solution are mixed with 150 g. of pozzolanic metakaolin (Imery Argical M1000) at a mixing speed of 800 rpm and for 10 min. using a mechanical stirrer to form a geopolymer solution.

In a subsequent step 280 gr of geopolymer pre mix were added to the geopolymer solution obtained from the previous step. The obtained slurry is mixed for 10 min.

The friction material has the composition of Table 4.

TABLE 4

| | Geopolymer pre-mix % Vol |
|---|---|
| Aramidic Fiber | 1-4 |
| Rock Fiber | 6-11 |
| Friction powder | 0.5-3 |
| Carbon | 8-20 |
| Rubbber | 1-4 |
| Middle Abrasive | 5-7 |
| Mild Abrasive | 9-12 |
| Sulfurs | 3-9 |
| Steel Fiber | 5-11 |
| Inorganic binder | 30-75 |
| TOTAL | 100 |

The $SiO_2/Al_2O_3$ is 5, the $SiO_2$ ratio is 1.2 and the $H_2O/Al_2O_3$ ratio is 24.5

The slurry obtained from the previous step is casted into a hot mold at 80° C. to consolidate. The obtained pad are removed from the mold after 20 min.

The pads are then attached, e.g. glued, on the backplate (without the interposition of a traditional underlayer) and then the curing is done at 80° C. for 12 hours.

The time and temperature could clearly vary if the geopolymer composition is varied.

Example 4—Braking Tests

The brake pads produced as described in comparative example 1, comparative example 2 and illustrative example 3 were subjected to the following tests:

Efficiency Test have been performed according to the standard AKM as known by the skilled person including: settlement braking, braking at different fluid pressures, cold (<50° C.) assessment braking, simulated highway braking, two high-energy braking (first FADE test) series interspersed with a regenerative braking series. From this test it is also possible to extrapolate, using methods known to industry technicians, the wear to which the brake pad and disc are subjected.

Figure 3:
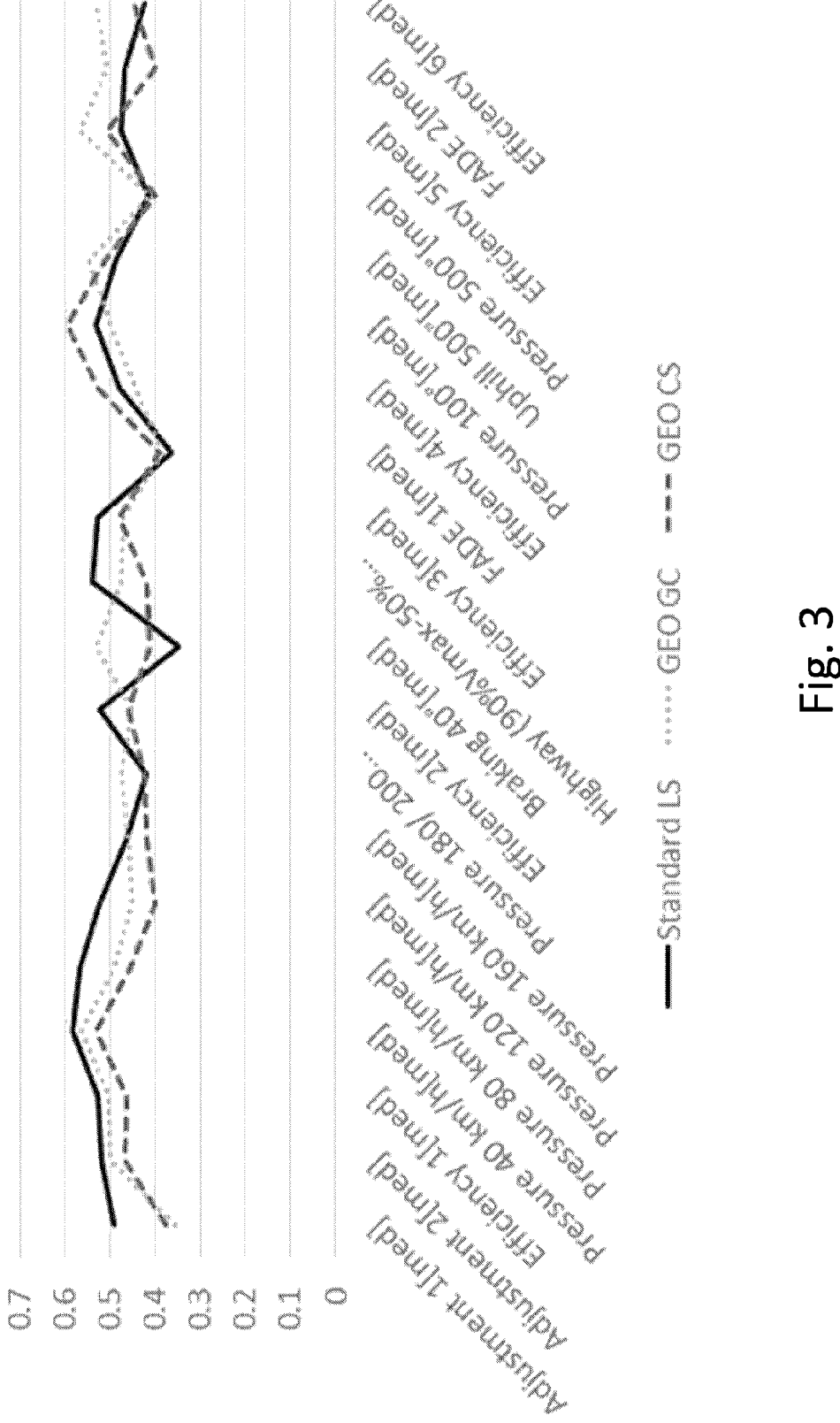

The results obtained are illustrated in FIG. 3, which schematically represents an extract of the significant data of the experimental curves obtained. The Standard LS curve corresponds to a braking pad comprising the friction material of the comparative example 1, the GEO CS curve corresponds to a braking pad comprising the friction material of the comparative example 2 and the GEO GC curve corresponds to the braking pad comprising the friction material of the illustrative example 3.

At the end of the braking test, the brake pads and discs are dismounted, examined, and photographed and the wear can be calculated both on the brake pads and brake discs. The brake pads produced according to the example 1 show very similar pad and disc wear to the comparative examples.

The invention claimed is:

1. A method for making a braking element, including the following steps:
   a) forming a geopolymeric solution by mixing an aluminosilicate source with an alkaline silicate solution;
   b) obtaining a slurry by adding a friction mix to the formed geopolymeric solution from the previous mixing step, wherein the geopolymeric solution is a binder for the friction mix;
   c) casting the slurry in a mold without pressure at a temperature between room temperature and 120° C., and maintaining the slurry inside the hot mold for a time comprised between 5 minutes and 2 hours until the slurry is substantially solidified;
   d) demolding the solidified slurry to obtain a pad or block of solid friction material;

e) attaching a backplate to the pad or block of solid friction material, wherein the step of attaching is carried out:
      i) either as a consequence of the casting step, having been provided the backplate within the mold, or
      ii) after the pad or block of solid friction material is demolded;
   f) curing for a time between 1 and 24 hours and at a temperature of between 60° C. and 120° C. the pad or block of solid friction material having the backplate attached to it; and wherein
   g) the aluminosilicate source and the alkaline silicate in step a) are chosen so that a $SiO_2/Al_2O_3$ molar ratio in the solid friction material is between 3 and 5;
   h) the alkaline silicate solution in step a) is chosen so that a $SiO_2/R_2O$ molar ratio in the solid friction material is between 0.7 and 1.5, and wherein R is chosen among Na, K, and Li; and
   i) the binder formed by the geopolymeric solution is present in the slurry in a quantity equal to or greater than 30% by volume based on the total volume of the slurry.

2. The method according to claim 1, wherein the aluminosilicate source is chosen from the group consisting of metakaolin, kaolin, fly ash, bottom ash, and mixtures thereof.

3. The method according to claim 1, wherein the aluminosilicate source comprises metakaolin.

4. The method according to claim 1, wherein the alkaline silicate solution is chosen from the group consisting of sodium silicate and sodium hydroxide system, potassium hydroxide and potassium silicate system, lithium hydroxide and lithium silicate system, cesium hydroxide and cesium silicate system, and rubidium hydroxide and rubidium silicate system and mixtures thereof.

5. The method according to claim 1, wherein the friction mix comprises:
   fibers chosen from the group consisting of organic fibers, inorganic fibers, metallic fibers, and mixtures thereof and added in a quantity comprised between 2% in volume and 30% in volume out of a total volume of friction material;
   organic or inorganic fillers added in a quantity comprised between 2% to 40% in volume based on the total composition of the friction material; and
   friction modifier added in a quantity between 4% and 30% of the total volume of friction material.

6. The method according to claim 5, wherein the fillers are chosen from at least one of calcium carbonate, barium sulphate, magnesium oxide, calcium hydroxide, calcium fluoride, talc, mica, and mixtures thereof.

7. The method according to claim 1, wherein the geopolymeric solution in step a) is chosen so that the $H_2O/Al_2O_3$ molar ratio is between 10 and 25.

8. The method according to claim 1, wherein the braking element is a brake pad.

* * * * *